US012209611B2

United States Patent
Harvey

(10) Patent No.: US 12,209,611 B2
(45) Date of Patent: Jan. 28, 2025

(54) BEARING MATERIAL AND SOLID LUBRICANT

(71) Applicants: Mahle International GmbH, Stuttgart (DE); Mahle Engine Systems UK Ltd., Warwickshire (GB)

(72) Inventor: Jennifer Harvey, Warwickshire (GB)

(73) Assignees: Mahle International GmbH (DE); Mahle Engine Systems UK Ltd (GB)

( * ) Notice: Subject to any disclaimer, the term of this patent is extended or adjusted under 35 U.S.C. 154(b) by 0 days.

(21) Appl. No.: 17/483,793

(22) Filed: Sep. 23, 2021

(65) Prior Publication Data

US 2022/0090630 A1 Mar. 24, 2022

(30) Foreign Application Priority Data

Sep. 24, 2020 (GB) ..................... 2015126

(51) Int. Cl.
*F16C 33/10* (2006.01)
*C08K 3/08* (2006.01)
*C08K 5/3492* (2006.01)
*C08L 79/08* (2006.01)
(Continued)

(52) U.S. Cl.
CPC ............ *F16C 33/1095* (2013.01); *C08K 3/08* (2013.01); *C08K 5/34924* (2013.01); *C08L 79/08* (2013.01); *C09D 179/08* (2013.01); *F16C 33/121* (2013.01); *F16C 33/124* (2013.01); *F16C 33/127* (2013.01); *C08K 2003/0812* (2013.01); *C08K 2201/011* (2013.01); *C08L 2205/14* (2013.01); *F16C 2204/12* (2013.01); *F16C 2204/20* (2013.01); *F16C 2208/58* (2013.01); *F16C 2223/42* (2013.01); *F16C 2240/48* (2013.01); *F16C 2240/60* (2013.01); *F16C 2360/22* (2013.01)

(58) Field of Classification Search
CPC ... C09D 179/08; C09D 179/085; C08L 79/08; C08L 79/085; C08L 2205/14; C08K 3/08; C08K 2003/0812; C08K 2201/011; C10M 171/06; C10M 169/044; C10M 2217/0403; C10M 2217/0443; F16C 33/20; F16C 33/201; C10N 2040/02
USPC ............ 384/13, 93, 155, 213, 241, 463, 606
See application file for complete search history.

(56) References Cited

U.S. PATENT DOCUMENTS 2,922,491 A * 1/1960 Macks ................ F16C 33/6696
384/468
10,472,586 B2 11/2019 Hwang
(Continued)

FOREIGN PATENT DOCUMENTS

CN 101408224 A 4/2009
EP 1236914 A1 9/2002
(Continued)

OTHER PUBLICATIONS

European Search Report for EP-21198355, dated Feb. 14, 2022.
(Continued)

*Primary Examiner* — Michael C Romanowski
(74) *Attorney, Agent, or Firm* — Fishman Stewart PLLC

(57) ABSTRACT

A bearing material may include a matrix of polyamide-imide polymer material, and a solid lubricant particulate. The solid lubricant particulate may have a median particle size of less than 1 micrometre.

10 Claims, 2 Drawing Sheets

(51) Int. Cl.
*C09D 179/08* (2006.01)
*F16C 33/12* (2006.01)

(56) References Cited

U.S. PATENT DOCUMENTS

| | | | | |
|---|---|---|---|---|
| 2002/0155304 A1* | 10/2002 | Tanaka | ................... | C08L 79/04 384/909 |
| 2003/0031389 A1* | 2/2003 | Kanayama | ........... | F16C 33/201 384/42 |
| 2004/0224856 A1* | 11/2004 | Saiki | ................... | C09D 179/08 508/108 |
| 2005/0025977 A1* | 2/2005 | Adam | ................... | F16C 33/201 428/422 |
| 2007/0297704 A1* | 12/2007 | Mayston | ............... | F16C 33/201 508/183 |
| 2008/0187260 A1* | 8/2008 | Schubert | ............... | C23C 28/322 384/294 |
| 2008/0194437 A1* | 8/2008 | Murase | ............... | C10M 169/04 508/108 |
| 2008/0292815 A1* | 11/2008 | Iwata | ................... | F16C 33/201 427/595 |
| 2008/0312357 A1* | 12/2008 | Tanaka | ................... | C08L 77/00 523/149 |
| 2010/0261625 A1 | 10/2010 | Hakamata | | |
| 2010/0290727 A1* | 11/2010 | Bickle | ................... | F16C 33/201 384/430 |
| 2011/0268944 A1* | 11/2011 | Adam | ....................... | F16J 9/26 428/688 |
| 2012/0184471 A1 | 7/2012 | Windrich | | |
| 2012/0251020 A1* | 10/2012 | Swei | ................... | F16C 33/205 428/327 |
| 2013/0108195 A1* | 5/2013 | Sun | ................... | C10M 169/044 264/134 |
| 2014/0106162 A1* | 4/2014 | Junk | ................... | C10M 107/38 428/323 |
| 2015/0125101 A1* | 5/2015 | Kachoosangi | ........ | F16C 33/125 508/108 |
| 2015/0184694 A1* | 7/2015 | Mekhilef | ............. | C08G 73/105 428/458 |
| 2016/0060564 A1* | 3/2016 | Hwang | ................ | B05D 3/0254 427/374.1 |
| 2016/0076587 A1* | 3/2016 | Chitose | ................ | F16C 33/208 384/299 |
| 2016/0201719 A1* | 7/2016 | Gorges | ................... | G01K 11/16 116/216 |
| 2016/0273582 A1* | 9/2016 | Fisher | ................... | F16C 33/201 |
| 2016/0312827 A1* | 10/2016 | Gorges | ................. | F16C 33/206 |
| 2017/0073605 A1* | 3/2017 | Sasaki | ................... | F16D 69/025 |
| 2017/0081522 A1* | 3/2017 | Adam | ..................... | C09D 7/61 |
| 2017/0088792 A1 | 3/2017 | Kobayakawa | | |
| 2017/0138396 A1* | 5/2017 | Latham | ................... | F16C 33/64 |
| 2017/0233671 A1* | 8/2017 | Yamauchi | ........... | C10M 103/02 508/106 |
| 2017/0313893 A1* | 11/2017 | Yasuda | ................. | C10M 125/02 |
| 2018/0051749 A1* | 2/2018 | Beaurepaire | ......... | F16C 9/02 |
| 2018/0119740 A1* | 5/2018 | McEwan | ................ | C08L 79/08 |
| 2018/0187029 A1* | 7/2018 | Sperindio | ............. | B05D 5/083 |
| 2018/0362873 A1* | 12/2018 | Sasaki | ................... | C10M 171/00 |
| 2019/0177646 A1* | 6/2019 | Harvey | ................. | F16C 33/201 |
| 2019/0178290 A1 | 6/2019 | McEwan | | |
| 2019/0276762 A1* | 9/2019 | Yamane | ............... | C10M 107/44 |

FOREIGN PATENT DOCUMENTS

| | | | | |
|---|---|---|---|---|
| EP | 1813663 | A1 | 8/2007 | |
| EP | 2048391 | A2 * | 4/2009 | ............ F16C 33/201 |
| EP | 2592290 | A1 * | 5/2013 | ............ C23C 14/16 |
| EP | 2990432 | A1 | 3/2016 | |
| EP | 3495680 | A1 | 6/2019 | |
| GB | 2384033 | A | 7/2003 | |
| GB | 2524255 | A * | 9/2015 | ............ F16C 17/022 |
| GB | 2569158 | A | 6/2019 | |
| JP | 2003056566 | A | 2/2003 | |
| JP | 2006045463 | A | 2/2006 | |
| JP | 2010065821 | A | 3/2010 | |
| JP | 2015124338 | A * | 7/2015 | |
| WO | WO-15/024898 | A2 | 2/2015 | |

OTHER PUBLICATIONS

English abstract for JP-2006045463.
Chinese Search Report dated Jun. 16, 2022 for copending Chinese App. No. 202111084633.1.
Chinese Office Action dated Jun. 23, 2022 for copending Chinese App. No. 202111084633.1 (w_English_translation).
GB Search report for GB-2015126.2, dated Feb. 15, 2021.
European Office Action dated Feb. 9, 2023 for European Patent Application No. 21 198 355.6.
Communication Pursuant to Article 94(3) dated Jul. 18, 2023 for European Patent Application No. 212198355.6.

* cited by examiner

BEARING MATERIAL AND SOLID LUBRICANT

CROSS-REFERENCE TO RELATED APPLICATION

This application claims priority to Great Britain Application No. 2015126.2 filed on Sep. 24, 2020, the contents of which are hereby incorporated by reference in its entirety.

TECHNICAL FIELD

The invention relates to a bearing material, and a bearing element. In particular, the invention relates to an improved bearing material for use in an overlay forming a running surface or sliding surface of a plain bearing. Bearing materials and elements embodying the present invention are particularly suitable for use in automotive environments, including for supporting rotatable or slidable engine components and for use as, or as part of, other rotatable or sliding engine components. Such sliding engine components may include bearing lining shells, bushes, bearing surfaces of crankshafts, bearing surfaces of camshafts, bearing surfaces of connecting rods, thrust washers, bearing surfaces of a bearing block, bearing surfaces of a bearing cap, and piston assembly components such as piston rings, piston skirts, and cylinder walls and cylinder liners.

BACKGROUND

In internal combustion engines, the main-bearing assemblies typically each comprise a pair of half bearings retaining a crankshaft that is rotatable about an axis. Each half bearing is a generally semi-cylindrical bearing shell, and typically at least one is a flanged half bearing provided with a semi-annular thrust washer extending outwardly (radially) at each axial end.

The bearing surfaces of bearing shells conventionally have a layered construction, in which a substrate comprising a strong backing material is coated with one or more layers having preferred tribological properties to provide a bearing surface that, in use, faces a cooperating moving part such as a crankshaft journal. In known bearing shells, the substrate comprises a backing coated with a lining layer, and the substrate is in turn coated with an overlay formed from a bearing material. The overlay is typically between about 6 and about 25 micrometres thick and may be formed of a plastic polymer-based composite layer or a metal-alloy layer (e.g. a tin-based alloy overlay).

The function of the overlay is to provide a relatively soft, conformable layer that can accommodate any small misalignments between the harder steel crankshaft journal and the bearing shells, and receive and embed dirt particles that may circulate in the oil supply and enter the bearing, so as to prevent damage to or scoring of the journal. These functions of the overlay are respectively termed conformability and embedability.

Polymer-based bearing materials have become popular for use as overlays in recent years, and research into sliding components has resulted in a wide range of compositions of polymeric bearing materials.

With the advent of stop start engines and trends towards engine downsizing, engine bearings, in particular conrod and main bearings, are expected to perform under increasingly severe environments. The increased number of stop start cycles, in which oil films are depleted, means that the frictional, wear, and fatigue resistance properties of the bearing overlay and the overlay lifetime are key to bearing performance.

t is generally known to add solid lubricants to polymer-based bearing materials. Solid lubricants, also known as dry lubricants, are used to improve the material frictional properties and to provide a self-lubricating effect. In this way, the solid lubricants may improve seizure resistance of the bearing material. Seizure may occur when a bearing material, or an underlying metallic substrate becomes physically connected to the journal material. It is therefore highly advantageous to avoid seizure in bearing components. Fatigue and wear resistance of the bearing material may also be improved by the addition of solid lubricants, thereby increasing the working life of the bearing material.

There is a need for bearing materials to exhibit high fatigue resistance. Fatigue is the process by which materials fail due to repeated loading and unloading at stresses below the ultimate strength of the material. Bearing surfaces and other sliding components need to be capable of being used for a high number of cycles without failure due to fatigue. High fatigue resistance is therefore desirable for bearing materials.

According to a first aspect of the invention, there is provided a bearing material comprising, a matrix of polyamide-imide polymer material, and a solid lubricant particulate. The solid lubricant particulate has a median particle size of less than 1 micrometre.

The provision of a polymer matrix of polyamide-imide (PAI) polymer material advantageously provides a robust and effective base for the bearing material.

In the aggressive conditions of modern internal-combustion engines, stop-start operation requires a typical engine to undergo a greatly increased number of stop-start operations. Each time an engine restarts, full hydrodynamic lubrication may not be in place and so bearings such as crankshaft bearings need to be able to survive an increased number of non-hydrodynamically-lubricated start-up operations. PAI-based bearing materials, with suitable filler materials, have demonstrated superior performance to other polymer materials under such conditions. The use of polyamide-imide polymer material in the bearing material of the present invention may thus advantageously provide a bearing material with good performance, including conformability and embedability.

While it is known to provide solid lubricant, the inventors have identified that the provision of solid lubricant particulate having a median particle size of less than about 1 micrometre improves fatigue resistance of the bearing material.

Without wishing to be bound by theory, it is thought that the improved fatigue resistance observed may be as a result of a reduced surface roughness associated with using smaller solid lubricant particulate. Smaller solid lubricant particles results in a greater number of point contacts of solid lubricant particles exposed on the surface of the bearing material, for a given weight percentage of solid lubricant particulate. Using SEM analysis, it was estimated that a bearing material comprising PTFE solid lubricant particulate having a median particle size of about 300 nanometres had approximately four times as many solid lubricant point contacts on its surface compared to a bearing material containing the same weight fraction of PTFE solid lubricant particulate but with a particle size of about 3 micrometres. The increased number and density of point contacts of solid lubricant improves the lubrication properties of the solid lubricant.

t was further observed that the provision of solid lubricant patriciate having a median particle size of less than 1 micrometre improves the fatigue properties of the bearing material. Without wishing to be bound by theory, it is thought that solid lubricant particulate may act as crack initiation sites for fatigue cracks, the development of which may lead to fatigue failure of the bearing material. Where the solid lubricant particulate has a large particulate size, of larger than about 1 micrometre, these fatigue cracks are relatively deep and are generally aligned along a few axes. By contrast, where the solid lubricant particulate has a particle size of less than 1 micrometre, for example about 300 nanometres, the observed fracture structure is finer. The fatigue cracks observed are considerably shallower and form a substantially multidirectional network. Accordingly, while solid lubricant particulate having a particle size of less than 1 micrometre is still thought to contribute to fatigue crack initiation, these cracks are believed to have less of a detrimental effect on the fatigue performance of the bearing material.

In addition, it was found that the wear properties of bearing materials according to the present invention were substantially the same as those of bearing materials having larger solid lubricant particulate.

As used herein, the term "median particle size" refers to the D50 value for the particulate distribution. In other words, it is the size of particle where half of mass of the particles in the distribution are larger than this size and half of the mass of the particles in the distribution are smaller than this size. Techniques for determining the D50 value of a particulate distribution would be familiar to the skilled person.

The solid lubricant particulate may be substantially homogenously distributed throughout the matrix of polyamide-imide polymer material.

The solid lubricant particulate may be any solid lubricant. The solid lubricant particulate may comprise a fluoropolymer.

Fluoropolymers have been found to be particularly effective as solid lubricants. Examples of suitable fluoropolymer include fluorinated ethylene-propylene (FEP), polyvinylfluoride (PVF), polyethylenetetrafluoroethylene (ETFE). Other suitable materials are envisaged and will be readily apparent to the skilled person.

The solid lubricant particulate may comprise more than one fluoropolymer. For example, the solid lubricant particulate may comprise more than 2, more than 4, or more than 5 different fluoropolymers.

Preferably, where the solid lubricant particulate comprises a fluoropolymer, the fluoropolymer comprises polytetrafluoroethylene (PTFE). PTFE has been found to be the most effective of the fluoropolymers in terms of reducing the friction coefficient and improving the self-lubricating properties of the polymer-based overlay layer.

The bearing material may include only PTFE as a solid lubricant particulate. In other words, the bearing material may not include any solid lubricant particulate other than PTFE.

The solid lubricant particulate may comprise at least one of melamine cyanurate, molybdenum disulphide, tungsten disulphide, hexagonal boron nitride, metal sulphides with layered structures, and graphite.

All of these have been found to be effective solid lubricants when used in bearing materials. Melamine cyanurate may be a particularly effective solid lubricant exhibiting superior fatigue and seizure resistance in the bearing material.

The solid lubricant particulate has a median particulate size of less than 1 micrometre. The solid lubricant particulate may have a median particulate size of less than 990 nanometres, less than 950 nanometres, or less than 900 nanometres. For example the solid lubricant particulate may have a median particle size of less than about 800 nanometres, less than about 600 nanometres, or less than about 400 nanometres.

As set out above, it has been observed that the provision of a solid lubricant particulate having a smaller median particulate size advantageously increases the number of point contacts exposed on the surface of the bearing material and alters the nature of the fatigue cracks in the bearing material.

The solid lubricant particulate may have a median particle size of more than about 50 nanometres. For example, the solid lubricant particulate may have a median particulate size of more than about 100 nanometres, more than about 200 nanometres, or more than about 300 nanometres.

It is anticipated that the solid lubricant particulate having a median particle size of less than about 50 nanometres may be less effective as a solid lubricant.

The solid lubricant particulate may have a median particle size of between about 50 nanometres and about 1 micrometre. For example, the solid lubricant may have a median particle size of between about 100 nanometres and about 800 nanometres, between about 200 nanometres and about 600 nanometres, or between about 300 nanometres and about 400 nanometres.

The solid lubricant particulate may have a median particulate size of about 300 nanometres.

The bearing material may comprise any amount of the solid lubricant particulate. Preferably, the bearing material comprises at least about 1 wt %, at least about 5 wt %, or at least about 8 wt % solid lubricant particulate.

The bearing material may comprise no more than about 20 wt %, no more than about 15 wt %, or no more than about 12 wt % solid lubricant particulate.

The bearing material may comprise between about 1 wt % and about 20 wt %, preferably between about 5 wt % and about 15 wt %, particularly preferably between about 8 wt % and about 12 wt % solid lubricant particulate.

The bearing material may comprise between about 5 wt % and about 12 wt % solid lubricant particulate.

Within this range, the incorporation of solid lubricant particulate may advantageously improve the frictional properties of the bearing material. Particularly advantageously, this quantity of solid lubricant particulate may produce a bearing material with acceptable wear and seizure resistance characteristics.

In particularly preferred embodiments, the bearing material comprises about 10 wt % solid lubricant particulate.

As used herein, with reference to the present invention, relative amounts of components in the bearing material are given in weight percentages (wt %). This refers to the dry weight percentages of each component. The skilled person would understand that this is the proportion of each component, given by weight, of the final bearing material following any curing steps and once any solvent has been removed.

The bearing material may comprise other components.

The bearing material may comprise a metallic particulate. The inventors have further identified that the provision of metallic particulate may increase the conformability, and the thermal conductivity of the bearing material. This may advantageously improve heat distribution throughout the polymer matrix. Moreover, the provision of metallic particulate may improve the fatigue resistance of the bearing material.

The metallic particulate may comprise any metal. For example, the metallic particulate may comprise at least one of aluminium, aluminium alloys, copper, copper alloys, silver, tungsten, tin, and stainless steel. The inventors of the present invention have identified that aluminium particulate provides the greatest improvement in fatigue resistance.

The metallic particulate may be any metallic particulate but preferably comprises metal flakes. The flake-like nature of the particulate generally results in the maximum area of metallic particulate being exposed to a co-operating shaft journal by virtue of the plane of the flakes orientating generally parallel to the bearing surface. The provision of flakes within the polymer-based overlay layer that are generally parallel to the bearing surface may be provided by spray deposition of the polymer-based overlay layer.

A further advantage of the platelet flake morphology of the metallic particulate is that the flakes are more securely bonded to the polymer-based matrix by virtue of the relatively large surface area of each individual flake, and thus resists metal flakes becoming plucked from the polymer-based matrix during engine operation.

The metallic particulate may comprise aluminium flakes.

The bearing material may comprise any amount of metallic particulate. Preferably, the bearing material comprises at least about 10 wt %, at least about 15 wt %, at least about 20 wt %, or at least about 24 wt % metallic particulate.

The bearing material may comprise no more than about 40 wt %, no more than about 35 wt %, no more than about 30 wt %, or no more than about 28 wt % metallic particulate.

The bearing material may comprise between about 10 wt % and about 40 wt %, between about 15 wt % and about 35 wt %, between about 20 wt % and about 30 wt %, or between about 24 wt % and about 28 wt % metallic particulate.

The inventors have found that the provision of less than about 10 wt % metallic particulate does not have a significant enhancing effect on the fatigue and seizure resistance of the overlay layer. It was also found that providing more than about 40 wt % metallic particulate may have an unacceptable and detrimental effect on the wear resistance of the bearing material. Additionally, providing more than about 40 wt % metallic particulate may compromise the structural integrity of the polymer matrix.

In preferred embodiments, the bearing material comprises between about 24 wt % and about 28 wt % metallic particulate. In particularly preferred embodiments, the bearing material comprises about 26 wt % metallic particulate.

In addition to the components set out above, the bearing material may comprise one or more additional components. For example, the bearing material may comprise at least one of a dispersant, an adhesion agent, and a leveller.

The provision of a dispersant may advantageously ensure that the particulate content of the bearing material is evenly dispersed throughout the polymer matrix. This advantageously ensures that the bearing material has homogeneous and predictable properties.

The bearing material may comprise any amount of dispersant.

The provision of an adhesion agent may advantageously enhance adhesion between the polymer matrix and the substrate onto which the bearing material is applied. Suitable adhesion agents include silane material. A suitable silane material may be gamma-aminopropyltriethoxysilane (e.g. 3-aminopropyltriethoxysilane). A suitable alternative silane material may comprise bis-(gamma-trimethoxysilpropyl)amine. In addition to promoting adhesion, silane materials may promote stability of the polymer matrix of polyamide-imide polymer material.

The bearing material may comprise any amount of adhesion agent. For example, the bearing material may comprise at least about 1 wt %, at least about 2.5 wt %, or at least about 3 wt % adhesion agent. The bearing material may comprise no more than about 15 wt %, no more than about 10 wt %, or no more than about 5 wt % adhesion agent.

The bearing material may comprise between about 1 wt % and about 15 wt %, between about 2.5 wt % and about 10 wt %, and about 3 wt % and about 5 wt % adhesion agent. In particularly preferred embodiments, the bearing material comprises about 5 wt % adhesion agent.

The leveller may act as a surface coating additive to improve wetting of the polymer matrix on a substrate, for example a metal substrate, when the polymer matrix is applied to the substrate. Improved wetting advantageously results in a bearing material having a more even thickness.

The bearing material may comprise any amount of leveller.

The balance of the bearing material may comprise the polyamide-imide polymer material.

In a particularly preferred embodiment, the bearing material may comprise between 8 wt % and 12 wt % of the solid lubricant particulate, the solid particulate comprising PTFE particulate having a median particle size of about 300 nanometres, the bearing material further comprising between 24 wt % and 28 wt % of aluminium flakes, and between 3 wt % and 5 wt % of adhesion agent (silane).

According to a second aspect of the present invention, there is provided a bearing element comprising a substrate, and an overlay layer on the substrate, the overlay layer comprising a bearing material according to the first aspect of the present invention.

Particularly advantageous applications for the bearing elements are as sliding bearings in combustion engines, for example crankshaft and/or camshaft supporting bearings, big end bearings and small end bushings. Bearing elements embodying the invention are particularly suitable for use in vehicle engines, including those equipped with stop-start engine technology in which the engine is subjected to a substantially greater number of starts over the life of the engine than in conventional engines and in which the crankshaft is regularly accelerated from rest before a uniform hydrodynamic film of lubricant is established on the bearing/running surface.

Bearing elements embodying the invention may also be used to form any of a number of sliding surfaces on engine components including bushes, piston skirts, piston rings, liners, camshafts and conrods. They may also be used as, or as part of any of thrust washers, flanges and half liners. Other suitable applications are envisaged and will be readily apparent to the skilled person.

The substrate may comprise any suitable material. Preferably, the substrate comprises a strong metal to give the bearing element greater structural rigidity. Suitable metallic substrate materials include: steel, aluminium, bronze, brass, bismuth, copper, nickel, tin, zinc, silver, gold and iron, or alloys of such materials. The substrate may comprise a combination of two or more such materials or alloys.

Particularly suitable substrate materials for bearing elements embodying the present invention include steel, iron, aluminium, copper alloy, bronze, and brass alloys.

The overlay layer comprising the bearing material may have any thickness. For example, the overlay layer may have a thickness of at least about 1 micrometres, at least about 3 micrometres, or at least about 5 micrometres, or at least about 10 micrometres. The overlay layer may have a thickness of no more than about 20 micrometres, no more than about 18 micrometres, no more than about 15 micrometres, or no more than about 14 micrometres. The overlay layer may have a thickness of between about 1 micrometres and about 20 micrometres, between about 3 micrometres and about 18 micrometres, between about 5 micrometres and about 15 micrometres, or about 10 micrometres and about 14 micrometres. In some particularly preferred embodiments, the overlay layer has a thickness of between about 6 micrometres and about 14 micrometres, preferably between about 10 micrometres and about 12 micrometres.

In some embodiments, the bearing material is provided as an overlay layer directly on the surface of the substrate. Where this is the case, there are no intermediate layers between the substrate and the bearing material.

In some embodiments, the bearing element further comprises an intermediate layer between the substrate and the overlay layer. The intermediate layer, or lining layer, may advantageously provide an improved surface for adhesion of the bearing material when certain metallic substrate materials are used.

The intermediate layer may have a thickness of from about 0.1 millimetres to about 0.5 millimetres.

The intermediate layer may comprise any suitable material. For example, the intermediate layer may comprise at least one of aluminium, tin, nickel, silver, copper and/or iron or alloys comprising one or more of such materials. The intermediate layer may comprise a combination of two or more of such materials/alloys. The intermediate layer may also include an adhesion promoter and/or be subjected to a pre-treatment, for example a phosphating, chromating or silicating treatment.

In preferred embodiments, the intermediate layer comprises aluminium-based material (e.g. aluminium-tin alloy) or a copper-based material (e.g. copper-tin bronze). Preferably, the intermediate layer comprises an aluminium-tin alloy.

According to a third aspect of the present invention, there is provided a method of forming an overlay layer of bearing material on a substrate, the method comprising steps of mixing polyamide-imide polymer material with solid lubricant particulate, and at least one solvent to form a pre-formulation, applying the pre-formulation to a substrate, and curing the pre-formulation to form an overlay layer of bearing material. The solid lubricant particulate in the overlay layer of bearing material has a median particle size of less than 1 micrometre.

The solvent is included to facilitate the formation of a mixture which can be applied to the substrate. The solvent can be employed in various proportions in order to achieve a particular desired viscosity of mixture for applying to the substrate. In some preferred embodiments, the solvent comprises at least one of n-butyl acetate and n-ethyl pyrrolidone.

The method may further comprise adding at least one of a dispersant, an adhesion agent, and a leveller to the pre-formulation.

In the development of the present invention, the inventors identified that solid lubricant particulate may be added to polyamide-imide polymer and the solvent in a state in which the solid lubricant particulate has a median particle size of between about 4 micrometres and about 6 micrometres. However, it is thought that the solid lubricant particulate particles of this size are formed from agglomerates of smaller particles since it has been observed that by the time the finished bearing material is formed, the median particle size is less than 1 micrometre. It is thought that the agglomerates of solid lubricant particulate are broken down into smaller particles during the manufacture of the bearing material and overlay layer.

The step of applying the pre-formulation to the substrate may involve applying the pre-formulation directly to the surface of the substrate. Where this is the case, there are no intermediate layers between the substrate and the bearing material.

Alternatively, the step of applying the pre-formulation to the substrate may involve applying the pre-formulation to an intermediate layer. The intermediate layer may be an intermediate layer as described above. For example, the intermediate layer may comprise an aluminium-based material or a copper-based material.

Where the method comprises applying the pre-formulation to an intermediate layer, the method may further comprise a step of modifying the surface of the intermediate layer before the pre-formulating is applied. For example, the method may comprise a step of grit blasting the intermediate layer. This may roughen the surface of the intermediate layer and may advantageously improve the adhesion of the pre-formulation to the intermediate layer.

The method may further comprise a drying step once the pre-formulation has been applied to the substrate. The drying step may be used to remove any solvent from the pre-formulation. The drying step may take place before the curing step. Alternatively, there may be a combined drying and curing step.

The step of curing the pre-formulation to form an overlay layer of bearing material may comprise a thermal or a non-thermal process. Where the curing process is a thermal process, the curing process may be provided by baking the substrate with the deposited pre-formulation in an oven or irradiating the substrate with infrared radiation. Where the curing process is a non-thermal process, the curing process may be provided by exposing the deposited pre-formulation to ultraviolet light.

Where the curing process is a thermal process, the time and temperature of the thermal curing step may be selected to achieve the desired level of polymer cross-linking of the polyamide-imide polymer material in the cured bearing material. Any degree of polymer cross-linking may be achieved by varying the parameters of the curing process. The degree of cross-linking of the polyamide-imide polymer material in the bearing material of the present invention may be less or lower than the degree of polymer cross-linking of polyamide-imide polymer materials in some bearing materials known in the art. It has surprisingly been found that the thermal curing parameters of the present invention lead to a degree of polymer cross-linking which provides advantageous properties in the behaviour of the polymer material. For example, it was found that the degree of polymer cross-linking in the polyamide-imide polymer material advantageously improved the fatigue resistance of the bearing material of embodiments of the present invention.

The method may further comprise applying a further amount of pre-formulation on top of the first amount of pre-formulation. In this way, the overlay layer of bearing material may be built up with multiple layers of pre-formulation. Preferably, the pre-formulation is dried between each application of pre-formulation. In this embodiment, the method may include alternating steps of applying the pre-formulation and drying. The method may comprise a curing step between each application of pre-formulation. In this embodiment, the method may include alternating steps of applying the pre-formulation and curing.

Alternatively, the method may comprise a single curing step once the desired number of layers of pre-formulation have been applied.

The provision of applying the pre-formulation in a plurality of discrete layers advantageously reduces the drying time since the solvent will be more readily removed from a thin layer rather than a thick layer of pre-formulation. Furthermore, it may advantageously allow for greater control of the thickness of the finished bearing material.

The step of applying the pre-formulation to the substrate may comprise at least one of spraying, and screen printing. Alternatively, or in addition, the step of applying the pre-formulation to the substrate may comprise at least one of ink-jet printing, spin coating, or transfer coating using a brush or roller.

It should be appreciated that any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE DRAWINGS

The invention will further be described by way of example only with reference to the accompanying drawing, in which:—

DETAILED DESCRIPTION

Figure 1:
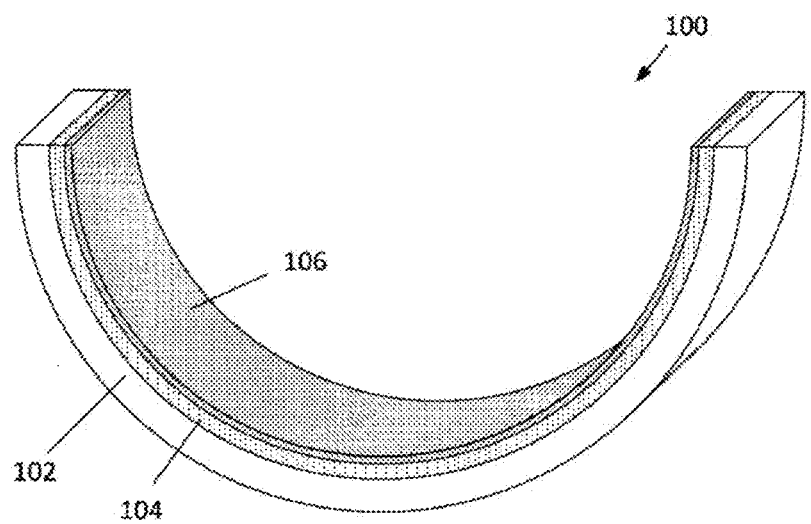
FIG. 1 shows a perspective view of a bearing element according to preferred embodiments of the present invention.

FIG. 1 schematically illustrates a bearing element, the bearing element is a semi-cylindrical bearing shell 100, which is also commonly referred to as a half bearing or a half shell, for a main bearing assembly of an internal combustion engine for retaining a cylindrical journal of a crankshaft.

The bearing shell 100 has a layered construction incorporating a substrate comprising a steel substrate 102 and intermediate or lining layer 104 comprising a layer of copper-tin bronze material. An overlay 106 of a bearing material is disposed on top of the intermediate layer 104.

Overlay layer 106 is formed from a bearing material comprising a polymer matrix of polyamide-imide polymer material with solid lubricant particulate dispersed within the polymeric matrix.

The bearing material comprises about 10 wt % solid lubricant particulate. The solid lubricant particulate has a median particle size of about 300 nanometres. The solid lubricant particulate is PTFE particulate.

The bearing material further comprises metallic particulate. The bearing material comprises about 26 wt % metallic particulate. The metallic particulate comprises aluminium flakes. The aluminium flakes have a length of less than 10 μm in a longest dimension and less than 1 μm in a dimension perpendicular to a longest dimension.

The solid lubricant particulate, and metallic particulate are distributed substantially homogeneously throughout the polymer matrix.

The bearing material also comprises a leveller, the relative quantity of which is set out below.

An adhesion agent is also added to the pre-formulation shortly before the pre-formulation is applied to the intermediate layer.

The overlay layer comprising the bearing material has a thickness of about 10 μm.

The bearing element shown in FIG. 1 is formed by the following method.

Polyamide-imide polymer material is mixed with PTFE particulate, aluminium flakes, a dispersant, and a leveller. A solvent is added to the mixture to form a pre-formulation which is capable of being applied to a substrate. The solvent comprises a mixture of n-butyl acetate and n-ethyl pyrrolidone.

The relative quantities, given in weight percentages, of the components of the finished bearing material, following the drying and curing steps, are set out below in Table 1.

TABLE 1

| Component | wt % in Bearing Material |
| --- | --- |
| Polyamide-imide | Balance |
| Aluminium flakes | 24 to 28 |
| PTFE particulate | 8 to 12 |
| Adhesion agent (silane) | 3 to 5 |

The method further comprises providing a steel substrate 102 having an intermediate layer 104 provided on its surface. The pre-formulation is then applied to the intermediate layer using spraying. The applied pre-formulation is then dried to remove the solvent. The dried pre-formulation is then cured using a thermal curing process at a temperature and for a duration to achieve a desired degree of cross-linking of the polyamide-imide polymer matrix. The pre-formulation is cured to form an overlay layer of bearing material having the composition set out in Table 1.

Figure 2:
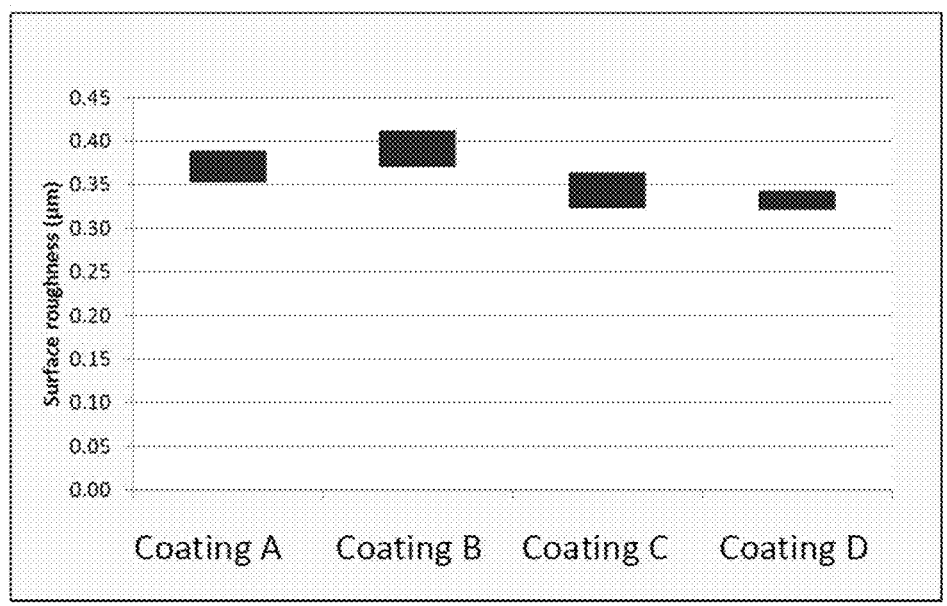
FIG. 2 is a graph showing surface roughness of the exposed surface of four different bearing materials, one of which is according to the present invention.

FIG. 2 is a graph showing the relative surface roughness for four different bearing materials, Coating A, Coating B, Coating C, and Coating D. The surface roughness shown on the vertical axis refers to the arithmetical mean roughness value (Ra) in micrometres. Ra is the arithmetical mean of the absolute values of the profile deviations from the mean line of the roughness profile. Ra was measured in accordance with EN ISO 4287. Each of the four different bearing materials have a composition as set out in Table 1. The solid lubricant PTFE particulate in Coating A, Coating B, and Coating C has a median particle size of between 2 micrometres and 4 micrometres and are not according to the present invention. The solid lubricant PTFE particulate in Coating D has a median particle size of about 300 nanometres and is according to the present invention. The weight fraction of solid lubricant PTFE particulate in each example is the same.

As can be seen from the graph in FIG. 2, the surface roughness of the sample according to the present invention, Coating D, has a markedly lower surface roughness compared to the samples with larger solid lubricant PTFE particulate. As set out above, it is thought that this reduced surface roughness is as a result of more, but smaller, point contacts of solid lubricant particles exposed on the surface of the bearing material. A lower surface roughness may advantageously be associated with improved fatigue resistance.

In addition, several scanning electron micrographs of the surface of each of Coating A to Coating D were obtained from an untested bearing. From the micrographs, the solid PTFE particulate solid lubricant could be identified. Using image analysis software, the average total percentage area of the solid PTFE particulate in the micrographs was determined along with the average total number of individual PTFE particles visible in each micrograph. These results are set out in Table 2 (below).

TABLE 2

|  | Coating A | Coating B | Coating C | Coating D |
|---|---|---|---|---|
| Average % area of PTFE particles | 4.2 percent | 5.5 percent | 4.9 percent | 17.7 percent |
| Average number of Individual PTFE particles | 846.49 | 840.84 | 1811.4 | 5874.48 |

As can be seen from Table 2, the coating according to the present invention having a median particle size of about 300 nanometres (Coating D) exhibits the greatest total area of PTFE particles. Indeed, the coating according to the present invention surprisingly exhibits over three times the area of PTFE particles compared to the closest coating of the prior art (Coating B) despite containing the same weight fraction of PTFE particulate. As set out above, an increased area of PTFE particles exposed on the surface of the coating improves the lubrication properties of the solid lubricant leading to improved seizure and fatigue resistance.

Furthermore, Table 2 also shows that the coating according to the present invention having a median particle size of about 300 nanometres (Coating D) exhibits the greatest total number of individual PTFE particles. Indeed, the coating according to the present invention surprisingly exhibits over three times more individual PTFE particles compared to the closest coating of the prior art (Coating C) despite containing the same weight fraction of PTFE particulate. As set out above, the increased number of individual PTFE solid lubricant particles leads to a greater number of point contacts of solid lubricant particles exposed on the surface of the bearing material, for a given weight percentage of solid lubricant particulate. Again, this has been found to improve the lubrication properties of the solid lubricant.

Figure 3:
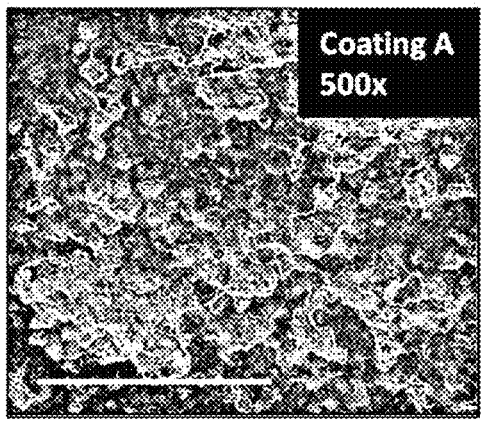
FIG. 3 is a micrograph of a bearing material according to the prior art.

FIG. 3 shows a 500× micrograph obtained using a scanning electron microscope of the surface of bearing material sample following a rig test, Coating A, comprising solid lubricant PTFE particulate having a median particle size of between 2 micrometres and 4 micrometres. The white scale bar has a length of 300 micrometres.

Figure 4:
FIG. 4 is a micrograph of a bearing material according to the present invention.

FIG. 4 shows a 500× micrograph obtained using a scanning electron microscope of the surface of bearing material sample following a rig test, Coating D, comprising solid lubricant PTFE particulate having a median particle size of about 300 nanometres. As with FIG. 3, the white scale bar in FIG. 4 has a length of 300 micrometres.

As can be seen from the micrographs, the sample containing smaller solid lubricant particulate (FIG. 4) has a considerably finer structure than the sample containing larger solid lubricant particulate. The contrast shown in the micrographs identifies the fatigue cracks initiated by the solid lubricant particulate. The fatigue cracks shown in FIG. 4 are shallower and extend in a greater number of directions than the cracks in FIG. 3. The finer, shallower, multidirectional morphology of the cracks in FIG. 4 are associated with improved fatigue resistance compared to the cracks in FIG. 3.

Accordingly, it was shown that bearings including a bearing material according to the present invention exhibit superior wear resistance compared to those of the prior art.

Although described herein and illustrated in the drawing in relation to a half bearing shell, the present invention may equally apply to other sliding engine components, including semi-annular, annular or circular thrust washers, and bushes, and engines comprising such sliding engine components.

The invention claimed is:

1. A bearing element, comprising
a substrate;
an overlay layer on the substrate; and
an intermediate layer between the substrate and the overlay layer,
the overlay layer including:
 a matrix of polyamide-imide polymer material;
 a solid lubricant particulate, in an amount of between about 5 wt. % and about 15 wt. % based on 100 wt. % total of the overlay layer; and
 a metallic particulate comprising metal flakes having a length of less than 10 μm in a longest dimension and less than 1 μm in a dimension perpendicular to the longest dimension, in an amount of between about 15 wt. % and about 35 wt. % based on 100 wt. % total of the overlay layer;
 wherein the metal flakes comprise at least one of aluminum, aluminum alloys, copper, copper alloys, silver, tungsten, tin, and stainless steel;
 wherein the solid lubricant particulate comprises at least one of molybdenum disulphide, tungsten disulphide, hexagonal boron nitride, and metal sulphides with layered structures;
 wherein the solid lubricant particulate has a median particle size of between about 100 nanometers and about 800 nanometers;
 wherein the solid lubricant particulate and the metallic particulate are distributed substantially homogeneously throughout the matrix of polyamide-imide polymer material;
the intermediate layer comprises at least one of a copper-based material and an aluminum-based material,
 wherein the intermediate layer has a thickness of from 0.1 millimeters to 0.5 millimeters; and
the overlay layer has a thickness of between 3 micrometers and 18 micrometers.

2. The bearing element according to claim 1, wherein the solid lubricant particulate further comprises a fluoropolymer.

3. The bearing element according to claim 2, wherein the fluoropolymer comprises PTFE.

4. The bearing element according to claim 1, wherein the solid lubricant particulate further comprises at least one of melamine cyanurate and graphite.

5. The bearing element according to claim 1, wherein the solid lubricant has a median particle size of about 300 nanometers.

6. The bearing element according to claim 1, wherein the metal comprise aluminum flakes.

7. The bearing element according to claim 1, wherein the overlay layer further comprises at least one of a dispersant, an adhesion agent, and a leveller.

8. The bearing element according to claim 1, wherein the overlay layer comprises:
- between 8 wt. % and 12 wt. % of the solid lubricant particulate, the solid particulate further comprising PTFE particulate having a median particle size of about 300 nanometers;
- between 24 wt. % and 28 wt. % the metal flakes, wherein the metal flakes comprise aluminum flakes; and
- between 3 wt. % and 5 wt. % of silane, based on 100 wt. % total of the overlay layer.

9. The bearing element according to claim 1, wherein the overlay layer includes between 24 wt. % and 28 wt. % of the metal flakes based on 100 wt. % total of the overlay layer, and the metal flakes comprise aluminum flakes.

10. The bearing element according to claim 1, wherein the overlay layer includes between 3 wt. % and 5 wt. % of silane based on 100 wt. % total of the overlay layer.

* * * * *